July 3, 1928.

C. E. FAURE 1,676,083

FASTENING DEVICE FOR BELTS

Filed Aug. 18, 1927     2 Sheets-Sheet 1

Inventor
C. E. Faure,

Attorneys

July 3, 1928.

C. E. FAURE 1,676,083

FASTENING DEVICE FOR BELTS

Filed Aug. 18, 1927    2 Sheets-Sheet 2

Inventor:
C. E. Faure,
by H. B. Willson & co
Attorneys

Patented July 3, 1928.

1,676,083

UNITED STATES PATENT OFFICE.

CHARLES EMILE FAURE, OF IVRY-SUR-SEINE, FRANCE, ASSIGNOR TO SOCIÉTÉ À RESPONSABILITE LIMITEE BONNART & CIE., OF PARIS, FRANCE, A LIMITED COMPANY OF FRANCE.

FASTENING DEVICE FOR BELTS.

Application filed August 18, 1927, Serial No. 213,915, and in France March 12, 1927.

The present invention relates to improvements in fastening devices for transmission belts and is adapted to remedy the various inconveniences existing in the devices actually in use.

The main inconveniences of these devices are the following:

The belt, at the place of the junction, is rendered rigid, this reducing the adherence and, consequently, the efficiency of the transmission.

One and the same type of junction or connection is not indifferently convenient for pulleys of small and large diameters.

For the purpose of principally remedying these inconveniences, the belt fastening device forming the subject-matter of the invention is essentially characterized in that it comprises at least two eyes rigidly secured on the ends of belts to be connected and hinged together by cat-gut axes, the bearing face of the eyes on the pulleys being coated with a lining made of a material such as that constituting the belt.

The accompanying drawing illustrate, by way of example only, forms of construction of the belt fastening device above characterized.

Figure 1:
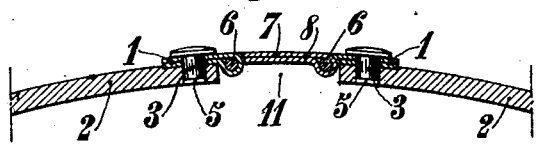
Fig. 1 is a general elevation with longitudinal section of a first form of construction.
Figure 2:
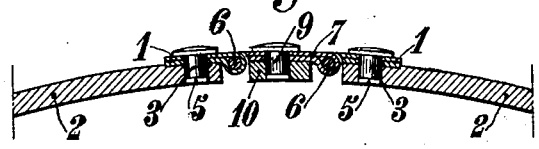
Fig. 2 is a general elevation with a section made according to line A—A of Fig. 3.
Figure 3:
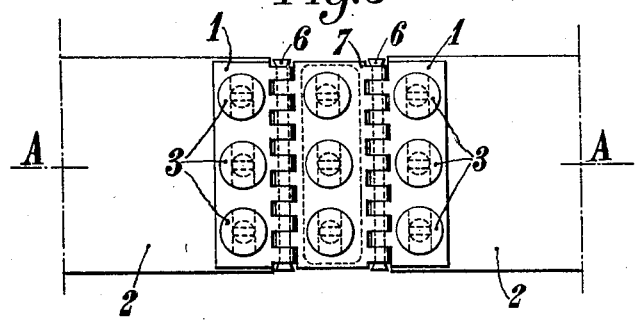
Fig. 3 is a plan view corresponding to Fig. 2.
Figure 4:
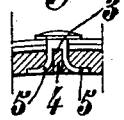
Fig. 4 is an elevation of a securing nut.
Figure 5:
Fig. 5 is an elevation of an intermediate member.

In the form of construction illustrated in Figs. 1 to 5, eyes 1 are secured at the ends of belts 2, by means of rivets 3 slotted at 4 and the flanges 5 of which can be bent down. These eyes 1 are obtained by means of a sheet-iron plate folded on itself and in such a manner that, in the region where the metal is folded, it is possible to introduce an axis 6. Two opposite eyes 1 are cut out in the region of the axis 6, so that they can, by engaging in each other, constitute a hinge owing to a connecting axis 6 preferably made of cat-gut.

It is also possible to interpose between the two eyes 1, an intermediate member 7 provided at its ends with two parallel conduits which are cut out as the eyes 1 with which it is connected. The connection between the intermediate member 7 and the eyes 1 is obtained by means of axes 6 made of cat-gut. The member 7 can be made from a tube, in which the flattening of the central portion realizes at the same time the conduits for the passage of the axes 6. The flattened portions can be rendered integral with each other by electric welding 8 or by riveting 9. This riveting 9 can be used, as in the example illustrated in Figs. 2 and 3, for securing an element 10 which, preferably, is made of the same material as the belt and which, by its presence, avoids shocks during the periodical passages of the cavity 11 on the transmission pulleys.

Figure 6:
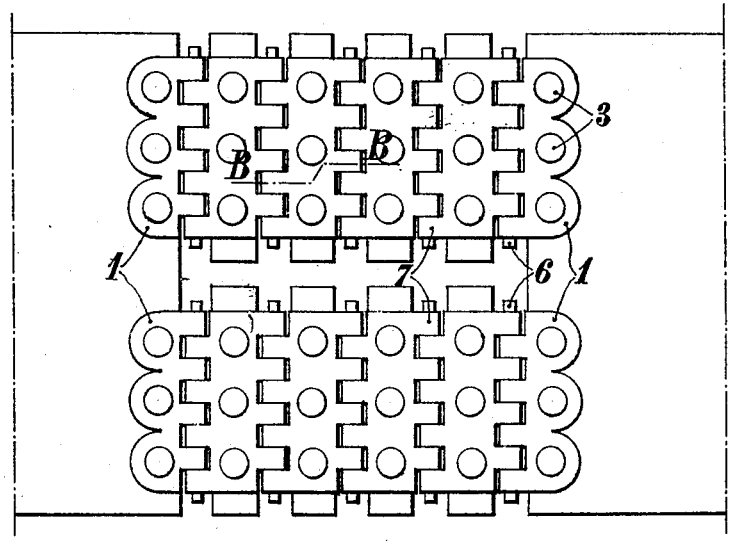
Fig. 6 is a plan view of a junction for a wide belt.
Figure 7:
Fig. 7 is a cross section made according to line B—B of Fig. 6.

End elements 1 and intermediate elements 7 of different widths can be provided, so as to be able, with a few distinct types only, to realize the junction of belts of very different widths. Fig. 6 illustrates a belt junction in position, in which use is made of two rows of juxtaposed elements. According to the width of the belt, more than two rows of elements can be used, by suitably choosing the width of the elements of one and the same row, in order that the whole should correspond to the width of the belt. The rows are slightly spaced apart, as shown in Fig. 6.

An important advantage of the junction or fastening device, forming the subject-matter of the invention, resides in the following fact:

For correcting the lengthening of new belts after a certain time of use, an initial width can be chosen for these belts, such that the junction is ensured by several intermediate elements 7. In proportion as the belt lengthens, one, two or more elements are removed. The initial number of these elements is chosen according to the width of the belt and the value of the lengthening it is liable to take, so that, when it is at the limit of its lengthening, the junction is ensured only by two end elements and at most by one intermediate element 7. The elements removed are available for ensuring the junction of other belts.

What I claim as my invention and desire to secure by Letters Patent is:

1. A belt fastener comprising a pair of plates each formed of a single piece of folded metal and having a plurality of spaced eyes on one edge, means for securing each of said plates to an end of the belt to be joined, a plurality of intermediate links hingedly connected together interconnecting said spaced eyes, said links being formed of a single piece of folded metal and liners, carried by the under surfaces of said links, of the same material and thickness of the belt to be joined.

2. A belt fastener comprising a pair of plates each formed of a single piece of folded metal and having a plurality of spaced eyes on one edge, means for securing each of said plates to an end of the belt to be joined, a plurality of intermediate links having a plurality of overlapping eyes along their adjacent edges, a rawhide pintle extending through said eyes, said links being formed of a flattened tube, the eyes of the end links overlapping said first mentioned eyes, a rawhide pintle extending through the overlapping eyes of said plates and said end links and liners, carried by the under surfaces of said links, of the same material and thickness of the belt to be joined.

In testimony whereof I have signed my name to this specification.

CHARLES EMILE FAURE.